United States Patent

Tamme et al.

Patent Number: 5,531,969
Date of Patent: Jul. 2, 1996

[54] SOLAR ENERGY INSTALLATION FOR CHEMICAL CONVERSIONS

[75] Inventors: Rainer Tamme, Ostfildern; Karin Huder, Filderstadt, both of Germany

[73] Assignee: Deutsche Forschungsanstalt fuer Luft- und Raumfahrt e.V., Bonn, Germany

[21] Appl. No.: 960,530

[22] Filed: Oct. 13, 1992

[30] Foreign Application Priority Data

Oct. 19, 1991 [DE] Germany .................. 41 34 614.9

[51] Int. Cl.[6] .................................................. B01J 19/12
[52] U.S. Cl. ........................................ 422/186; 422/906
[58] Field of Search ................. 422/186, 186.3, 422/906

[56] References Cited

U.S. PATENT DOCUMENTS

| | | | |
|---|---|---|---|
| 4,045,359 | 8/1977 | Fletcher et al. | 250/527 |
| 4,280,449 | 7/1981 | Künstle | 122/4 R |
| 4,517,063 | 5/1985 | Cirjak | 204/157.1 R |
| 4,966,759 | 10/1990 | Robertson et al. | 422/186 |
| 5,116,582 | 5/1992 | Cooper et al. | 422/186.3 |
| 5,126,111 | 6/1992 | Al-Ekabi et al. | 422/186.3 |
| 5,174,877 | 12/1992 | Cooper et al. | 204/193 |
| 5,260,036 | 11/1993 | Weigold et al. | 422/186.3 |

FOREIGN PATENT DOCUMENTS 2192195A  1/1988  United Kingdom .

OTHER PUBLICATIONS

*Patent Abstracts of Japan*, Patent No. 60–153939, vol. 9, No. 31, Dec. 12, 1985.

Primary Examiner—Charles T. Jordan
Assistant Examiner—Daniel Jenkins
Attorney, Agent, or Firm—Barry R. Lipsitz

[57] ABSTRACT

To improve a solar energy installation for chemical conversions comprising a receiver assembly for solar radiation and a chemical reactor which is supplied with solar radiation energy by the receiver assembly and in which chemical reactions take place due to the action of the solar radiation energy, such that optimum coupling of the solar radiation energy into the reactor is possible and, in addition, the reactor design is as simple and variable as possible and the reactor is connectable to the necessary supply devices in as easy a way as possible, it is proposed that the receiver assembly include several concentrators which each couple the solar radiation into one light guide respectively and that the light guides feed the solar radiation energy to the chemical reactor.

30 Claims, 4 Drawing Sheets

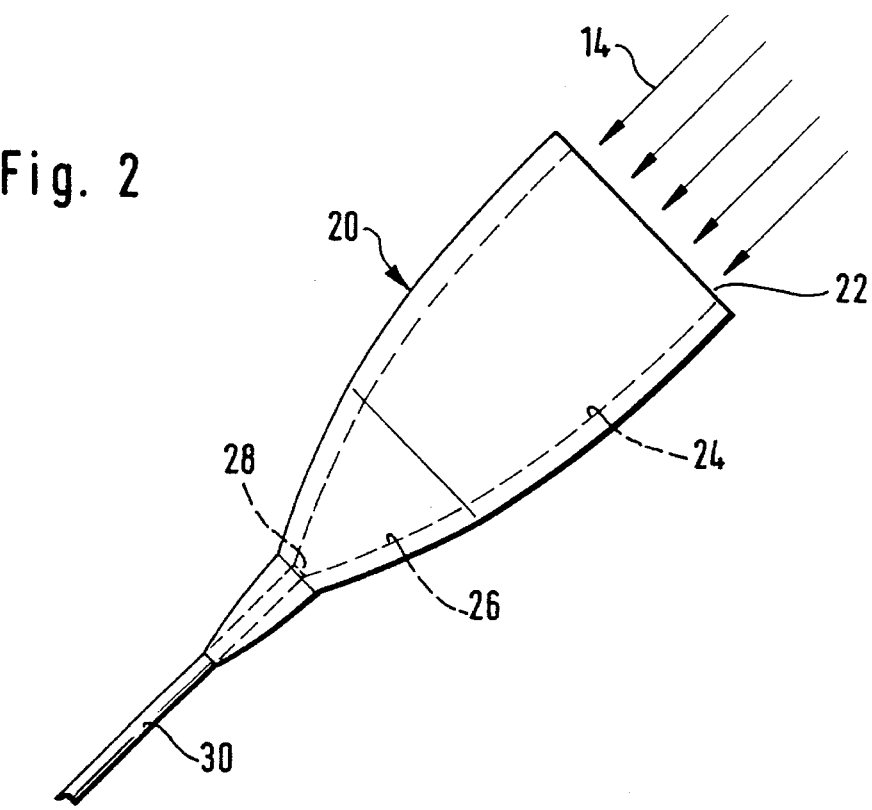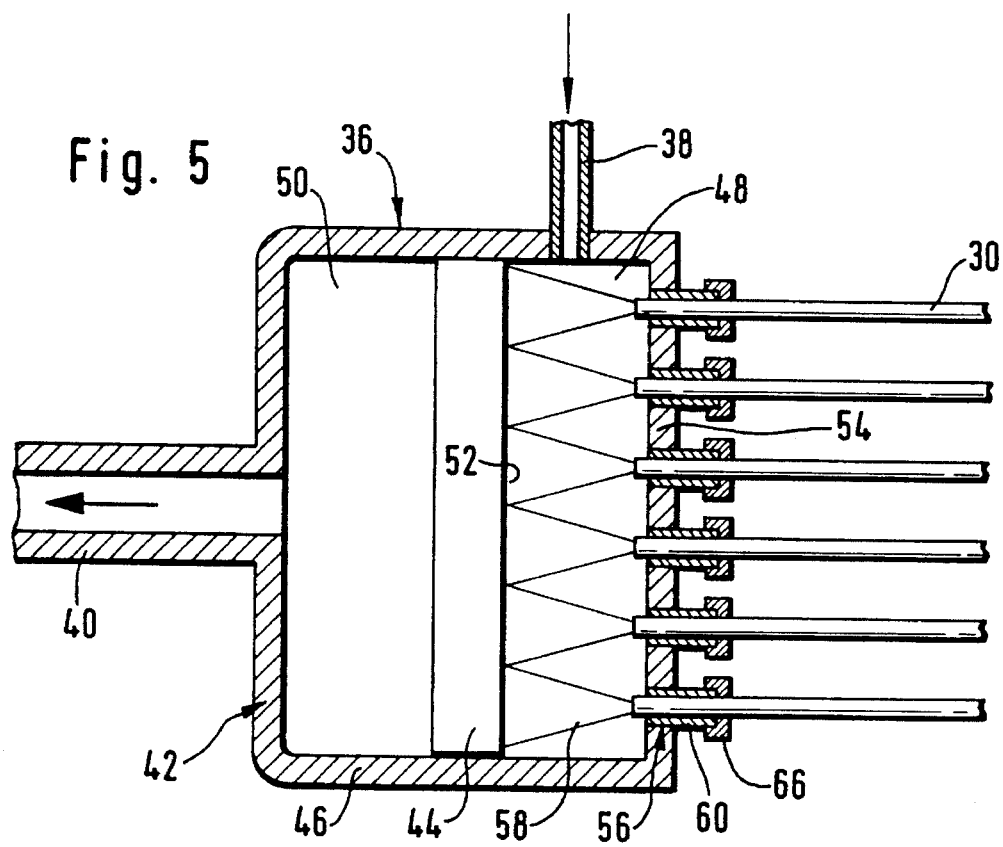

SOLAR ENERGY INSTALLATION FOR CHEMICAL CONVERSIONS

BACKGROUND OF THE INVENTION

The invention relates to a solar energy installation for chemical conversions comprising a receiver assembly for solar radiation and a chemical reactor which is supplied with solar radiation energy by the receiver assembly and in which chemical reactions take place due to the direct action of the solar radiation energy.

Solar energy installations in combination with chemical reactors are known. They comprise, for example, a reactor which is arranged on a tower and which is fed the solar radiation energy by reflection by means of heliostats which focus the solar radiation energy onto part of the reactor in the tower. The disadvantage of this arrangement is to be seen in the fact that the reactor has to be arranged on the tower and, therefore, very long pipelines are required for transportation of the materials. Also, expedient implementation of incidence of solar radiation energy into the reactor is only possible from one direction.

In another embodiment a paraboloidal reflector is provided for focusing the solar radiation energy onto a reactor arranged in the focal point thereof. In this case, too, long and also flexible feed pipes are required for the materials to be transported to the reactor which is arranged in the focal point and is taken along by the paraboloidal reflector in accordance with the position of the sun.

In the known embodiments for such reactors with solar radiation, provision is made either for part of the outside wall of the reactor to be irradiated (case I) or for the radiation to get into the interior of the reactor (case II) through a transparent window (e.g. glass or quartz). Disadvantages of these embodiments are an irregular supply of energy, large temperature gradients between wall and reaction chamber (case I) or sealing problems with the window (case II), which involves limitations in the reactor design and also practically excludes pressure operation on a technical scale.

SUMMARY OF THE INVENTION

The object underlying the invention is, therefore, to so improve a solar energy installation of the generic kind that optimum coupling of the solar radiation energy into the reactor is possible and, in addition, the reactor design is as simple and variable as possible and the reactor is connectable in as easy a way as possible to the necessary supply devices.

This object is accomplished in accordance with the invention in a solar energy installation of the kind described at the beginning by the receiver assembly including several concentrators which each couple the solar radiation into one light guide respectively and by the light guides feeding the solar radiation energy to the chemical reactor.

The advantages gained with the inventive solution are that, on the one hand, the receiver assembly can be designed so as to receive the solar radiation in an optimum way but, on the other hand, this is independent of the reactor design as a flexible connection between the receiver assembly and the chemical reactor is possible via the light guides and, furthermore, optimum feeding of the solar radiation energy to the chemical reactor is also possible via the light guides.

Herein it is particularly advantageous for the concentrators to be movable for alignment with the position of the sun so that these can always be aligned so as to receive the solar radiation in an optimum way and thus operate with optimum efficiency.

Furthermore, with the solar energy installation according to the invention it is particularly advantageous for the reactor to be arranged stationarily for, in this case, it is connectable in a particularly simple and advantageous way to the supply devices required for the reactor and, in particular, the long or even flexible feed pipes known from the prior art are not necessary.

For moving the concentrators, it has proven particularly advantageous for these to be movable by an aligning device which should preferably always align all of the concentrators in an optimum way.

So far, no details have been given about the arrangement of the concentrators. Here it is particularly advantageous, in particular, with a view to achieving a simple and effective construction, for the concentrators to be united to form a concentrator unit and, in particular, for several concentrator units to be provided.

Regarding the alignment, when there are several concentrator units, it is particularly advantageous for these to be individually alignable with the position of the sun by the aligning device so that each individual concentrator unit is optimally aligned.

In order to also achieve optimum exploitation of the solar radiation in the concentrator units, provision is advantageously made for the concentrators to be seated in the concentrator units with their inlet apertures packed closely together. In particular, it is advantageous for the inlet apertures of the concentrators of a concentrator unit to be seated next to one another without any spaces between them. In this connection, it has proven particularly advantageous for the inlet apertures to have a hexagonal cross-section for, in this case, they can be placed alongside one another in a particularly simple way without spaces between them.

So far, no details have been given about the design of the chemical reactor.

In an advantageous embodiment, provision is made for the chemical reactor to have a chemical reaction zone into which the solar radiation energy is introduced in a defined manner owing to the arrangement of the points at which the light guides enter the reactor. This enables the coupling of the solar radiation energy into the reactor to be implemented in a particularly advantageous way so that the chemical process taking place therein is optimally supplied with energy and thus takes place in an optimum way within the reactor.

In one embodiment of the reactor, provision is made for the reactor to be a pressure reactor in which chemical reactions take place under pressure.

This reactor is preferably designed so as to comprise a pressure vessel in which the chemical reaction takes place.

For example, such a reactor can be designed so as to comprise an absorber material which is arranged in the pressure vessel and preferably forms the reaction zone.

A chemical reaction can be carried out particularly advantageously in such a reactor when the absorber material is acted upon over a large area thereof by solar radiation. In particular, provision is made for the absorber material to be acted upon by solar radiation essentially over its entire surface in order to supply the absorber material optimally with solar energy and thus also allow the chemical reactions to take place as advantageously as possible in and on this absorber material.

For acting on the absorber material, it is particularly expedient for the entry points of the light guides to be arranged in a defined pattern in the pressure vessel.

In an advantageous embodiment of an inventive reactor, provision is made for it to extend in one direction and for the solar radiation energy to be introduced in a variable manner in this direction in accordance with the chemical reaction kinetics. For example, the substance to be made to react flows through the reactor in this direction and so the solar radiation energy is then introduced in the direction of flow of the substance in accordance with optimum reaction kinetics.

It is particularly advantageous for the solar radiation energy to be introduced in the direction in such a way that a constant or defined temperature prevails over the latter. In this case, the reaction conditions are thus clearly defined over the direction and, therefore, an optimum conversion process is possible.

Furthermore, within the scope of the present invention it is particularly advantageous for the solar radiation energy to be introduced in such a way that the intensity thereof is adjustable in a clear manner in the longitudinal direction. This is advantageous because the substance is heated up at the start and the major part of the substance reacts at the beginning so that the intensity of the solar radiation energy can decrease slowly in the further course and yet the energy required for the reaction of the remaining substance is still made available.

In all of the embodiments it has proven particularly advantageous for the light guides to lead directly into the reaction chamber.

Provision is preferably made—in particular with pressure reactors—for the light guides to be led into the reactor via screw fittings. The reactor itself may operate in many different ways and thus be equipped with very different types of absorbers or catalyst material.

In one advantageous embodiment, provision is made for the reactor to comprise a catalytic absorber.

In particular, the catalytic absorber is arranged in the form of a fixed bed and so the reactor is a fixed-bed reactor.

As an alternative to this, it is, however, also possible for the reactor to be of such design that a heterogeneous catalytic reaction or also a decomposition reaction takes place in it.

In another advantageous variant of an inventive reactor with light guides, provision is made for the absorber material to be arranged in the form of a fluid bed, with sufficient interspace remaining in this fluid bed for the surface of the absorber or catalyst particles to be acted upon by solar radiation energy essentially over the entire surface thereof owing to the movement.

Further features and advantages of the invention are the subject matter of the following description and the drawings of several embodiments.

BRIEF DESCRIPTION OF THE DRAWINGS

FIG. 2 an enlarged illustration of a concentrator;

FIG. 5 a section through a first embodiment of a reactor;

DETAILED DESCRIPTION OF THE INVENTION

Figure 1:
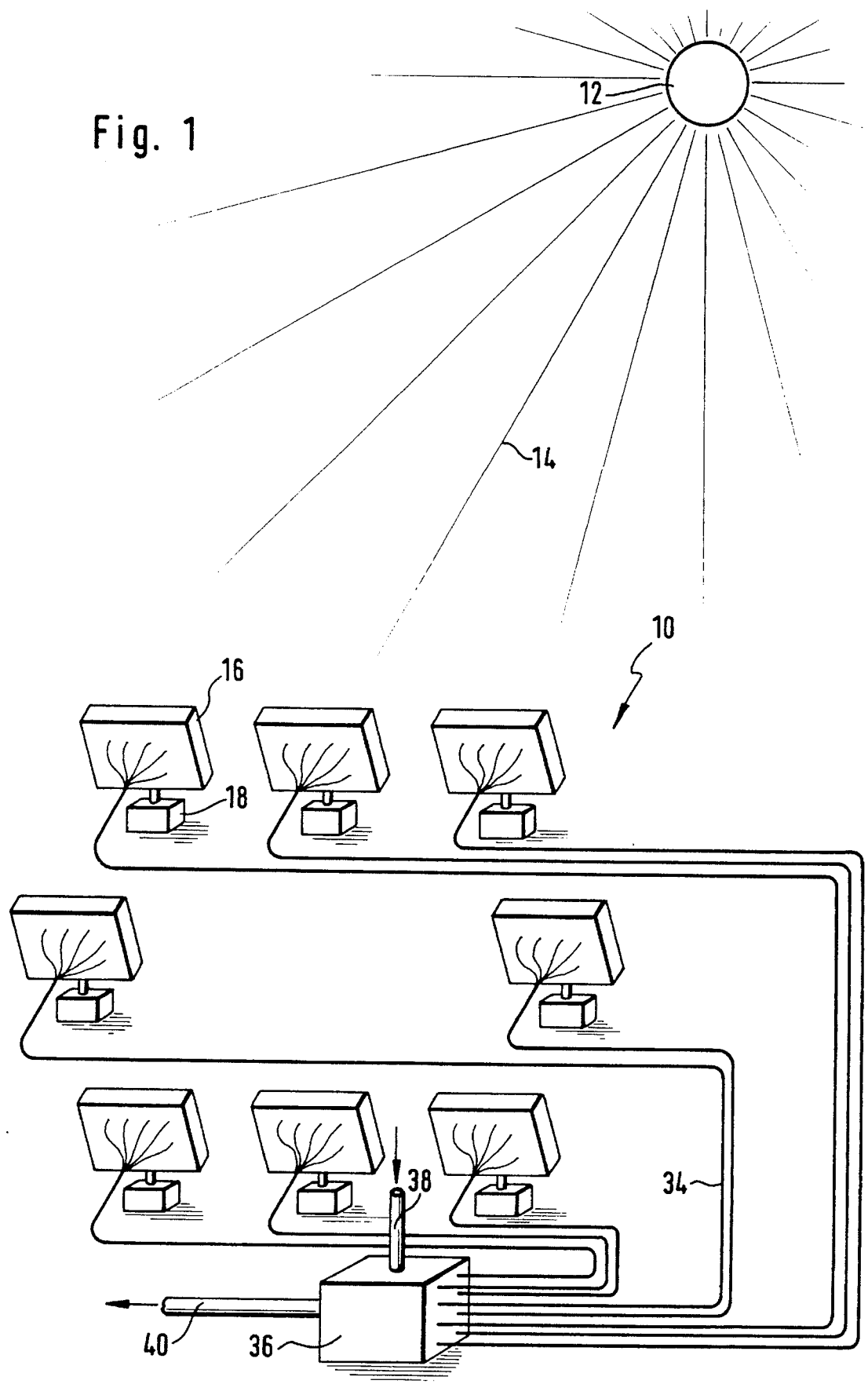
FIG. 1 a schematic illustration of a solar energy installation according to the invention.

An embodiment illustrated in FIG. 1 of a solar energy installation according to the invention comprises a receiver assembly 10 which receives solar radiation 14 coming from the sun 12.

This receiver assembly 10 is made up of a plurality of concentrator units 16. Each of the concentrator units 16 is seated on an aligning element 18 which aligns this concentrator unit 16 in an optimum way with the solar radiation 14 and thus follows the position of the sun 12. The concentrator units 16 are arranged in the form of a regular pattern on the ground and are carried by the aligning elements 18 which each stand on a base. All of the concentrator units 16 are preferably of identical design.

Each concentrator unit according to the invention comprises a plurality of concentrators 20, a single one of which is illustrated in FIG. 2. Each concentrator 20 has an inlet aperture 22 with an adjoining first parabolic reflector 24 which is followed by a second parabolic reflector 26, both of which reflect the incident solar radiation onto an end face 28 of a light guide 30 and into the latter, the end face 28 being arranged at the lowermost point of the second parabolic reflector 26.

Figure 3:
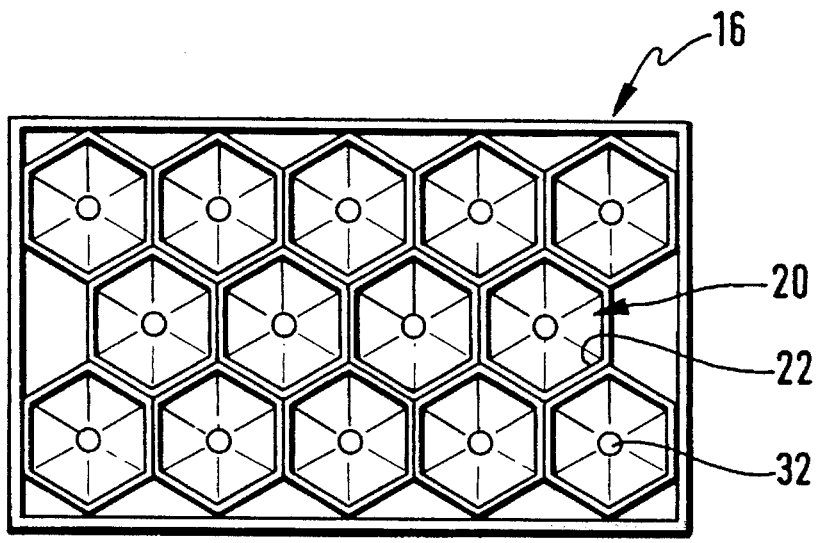
FIG. 3 a plan view of a front side of a concentrator unit.

As illustrated in FIG. 3, the concentrators 20 with their inlet apertures 22 preferably have a hexagonal cross-section so that the concentrators 20 of a concentrator unit 16 are seated with their inlet apertures 22 next to one another without spaces between them and form an inlet area 32 of the concentrator unit.

Figure 4:
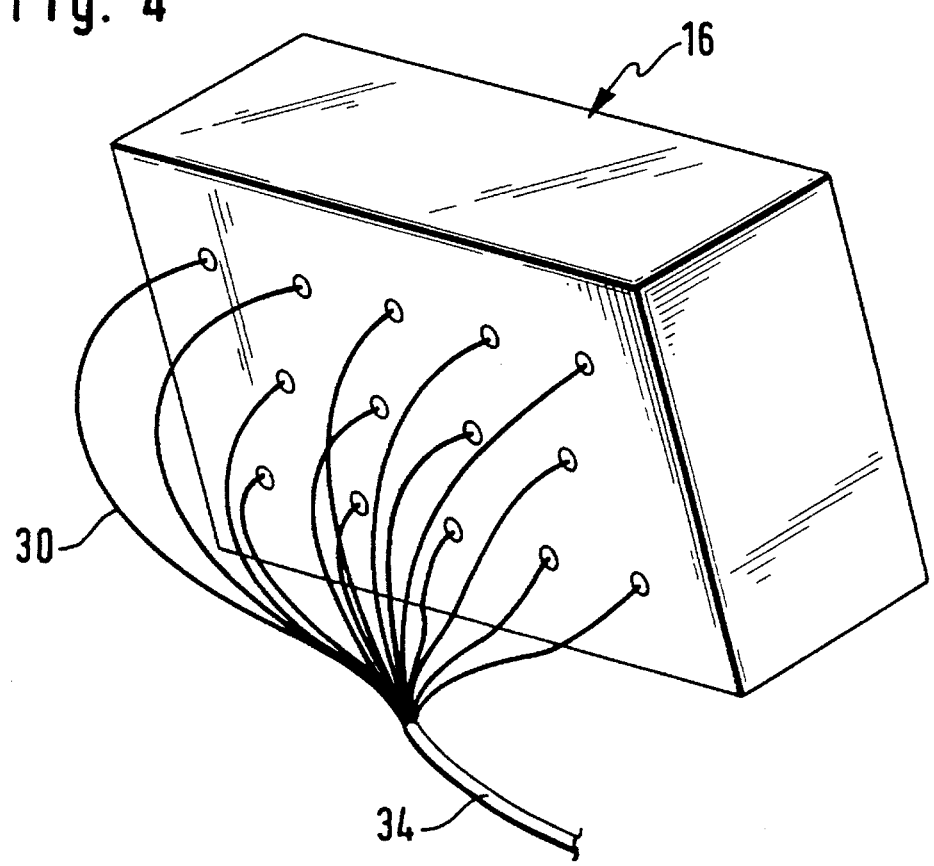
FIG. 4 a perspective view of a concentrator unit from the rear side.

As illustrated in FIG. 4, a light guide 30 extends away from each of the concentrators 20 and all of the light guides 30 of a concentrator unit 16 are bunched together to form a light guide bunch 34 which leads to a reactor designated in its entirety 36 of the solar energy installation. The reactor 36 is arranged independently of the receiver assembly 10, for example, stationarily beside it and is supplied via a pipeline 38 with the substance or substances which are to be made to react in the reactor 36. These issue again from the reactor 36 via a pipeline 40.

A first example of such a reactor is illustrated in FIG. 5. This reactor 36 comprises a pressure vessel 42 having arranged therein a bed of catalyst material 44 which represents a fixed bed. This bed of catalyst material 44 extends over the entire cross-section of the pressure vessel 42 to the outside walls 46 thereof. The bed of catalyst material 44 thus divides the interior of the pressure vessel into a first volume 48 and a second volume 50.

The pipeline 38 leads, for example, into the first volume 48 while the second pipeline 40 leads out of the second volume 50. The first pipeline 38 introduces a substance which is to be made to react in the reactor 42, for example, a gaseous medium, into the first volume 48. This then passes through the bed of catalyst material 44, after its reaction in the bed of catalyst material 44 enters the second volume 50 and from there leaves the pressure vessel 42 via the pipeline 40.

For irradiation of a large area of a front side 52 of the bed of catalyst material 44 delimiting the first volume 48 the individual light guides 30 are guided through an end wall 54 of the pressure vessel 42 facing the front side 52, in particular, by means of pressure-resistant screw fittings 56 inserted in the end wall 54. The points at which the light guides 30 extend through the end wall 54 are arranged in such a way that a conical beam of radiation 58 emerging from each light guide 30 overlaps the respective neighboring one in such a way that the front side 52 of the bed of catalyst material 44 is acted upon essentially uniformly with solar radiation energy.

Figure 6:
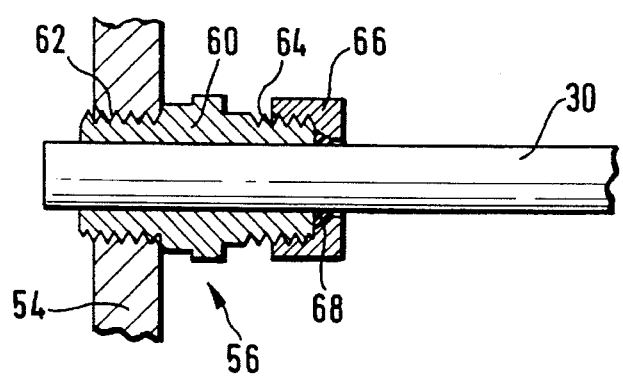
FIG. 6 a section through a screw fitting according to the invention.

Therefore, with the inventive solution, a very large area of the front side 52 can be acted upon with an essentially uniform intensity of the solar radiation energy without causing stability problems in the pressure vessel 42 since only one opening of very small cross-section is required for each individual light guide 30 in the end wall 54. An embodiment of an inventive screw fitting is illustrated in FIG. 6. This comprises an insert piece 60 which is screwable with a thread 62 into the end wall 54 and has a further thread 64 which is arranged opposite the thread 62 and onto which a coupling nut 66 is screwable for pressing a sealing element 68 between the light guide 30 and the insert piece 60 so that the light guide 30 is attachable in a pressure-tight manner to the insert piece 60 which, for its part, is screwable in a pressure-tight manner by means of the thread 62 into the end wall 54.

Figure 7:
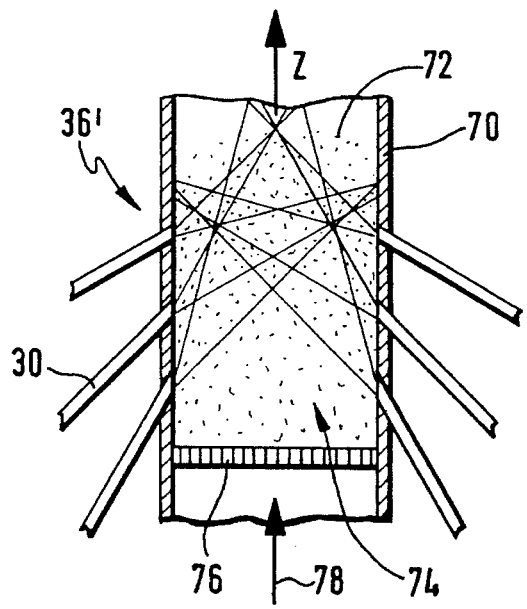
FIG. 7 a section through a second embodiment of a reactor according to the invention.

A second embodiment of an inventive reactor, designated 36', is illustrated in FIG. 7.

This reactor 36' comprises a reactor vessel 70 in which an absorber material 72 is provided in the form of a fluid bed designated in its entirety 74. The fluid bed 74 is arranged over a frit 76 and a current of gas 78 passes through it from below. In this reactor 36', the pipeline 38 enters below the frit 76 and the pipeline 40 removes the gas made to react in the fluid bed 74 from the reactor vessel 70 above the fluid bed 74.

The absorber material 72 held in the fluid bed 74 is acted upon by solar radiation energy by the light guides 30 leading into the reactor vessel 70 on all sides thereof, more particularly, in such a way that transversely to a direction Z which is predetermined by the current of gas 78, the fluid bed 74 is acted upon from all sides.

Figure 8:
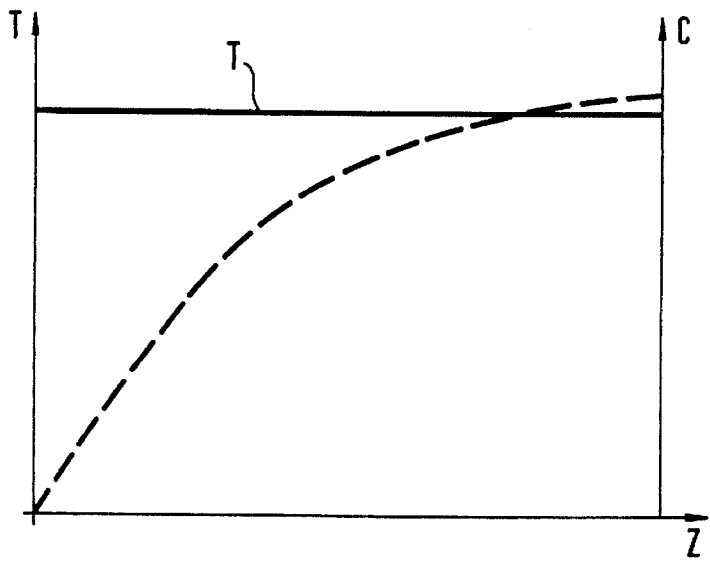
FIG. 8 a schematic illustration of the course of the temperature T and the concentration C of the reacted substance in the embodiment according to FIG. 7 plotted against the direction Z.

The points at which the light guides 30 enter the reactor vessel 70 are preferably selected in such a way that the temperature T remains substantially constant in the direction Z in the fluid bed 74 so as to provide constant reaction conditions. In this case, as illustrated in FIG. 8, the concentration of the reaction products increases constantly in the direction Z.

These advantageous conditions for the chemical reaction in the reactor vessel 70 are only achievable by irradiation of the fluid bed 74 from all sides and metering of the irradiation in the direction Z in order to maintain a constant temperature T in this direction.

The reactions that are possible in the reactor vessel 70 are preferably heterocatalytic and decomposition reactions.

The present disclosure relates to the subject matter disclosed in German application No. P 41 34 614.9-13 of Oct. 19, 1991, the entire specification of which is incorporated herein by reference.

What is claimed is:

1. A solar energy installation for chemical conversions comprising:

a plurality of light concentrators each having a respective light guide for receiving solar radiation from each light concentrator; and a stationary chemical reactor extending in a given direction, said light guides being connected to said reactor to introduce radiation therein with intensity variable in a predeterminable manner in the given direction.

2. The installation as in claim 1 wherein said concentrators are movable by an aligning device for alignment with the position of the sun.

3. The installation as in claim 1 wherein said concentrators are united to form a concentrator unit to supply radiation to said reactor.

4. The installation as in claim 3 wherein several concentrator units are provided.

5. The installation as in claim 4 wherein a concentrator unit is alignable with the position of the sun.

6. The installation as in claim 3 wherein concentrators are seated next to one another in a concentrator unit and have inlet apertures which are closely packed together.

7. The installation as in claim 6 wherein said inlet apertures of said concentrators of a concentrator unit are seated next to one another without spaces therebetween.

8. The installation as in claim 7 wherein said inlet apertures have a hexagonal cross section.

9. The installation as in claim 1 wherein said chemical reactor comprises a chemical reaction zone into which solar radiation is introducible in a defined manner by arranging the points at which said light guides enter said chemical reactor.

10. The installation as in claim 1 wherein said chemical reactor is a pressure reactor.

11. The installation as in claim 10, wherein said chemical reactor comprises a pressure vessel for a chemical reaction.

12. The installation as in claim 11 wherein said chemical reactor further comprises an absorber material in said pressure vessel.

13. The installation as in claim 12 wherein said absorber material is capable of being irradiated by solar radiation energy from said light guides.

14. The installation as in claim 13 wherein said absorber material has an outer surface capable of being essentially entirely irradiated by solar radiation energy from said light guides in order to influence a chemical reaction.

15. The installation as in claim 13 wherein entry points of said light guides are arranged in a defined pattern in said pressure vessel for irradiating said absorber material.

16. The installation as in claim 1 wherein solar radiation energy is introducible in the given direction so that temperature in said reactor is adjustable in a defined manner over the given direction.

17. The installation as in claim 16 wherein solar radiation energy is introducible so that a constant temperature prevails over the given direction.

18. The installation as in claim 1 wherein solar radiation energy is introducible with intensity decreasing in an essentially linear manner over the given direction.

19. The installation as in claim 1 wherein said light guides are led into said chemical reactor via screw fittings.

20. The installation as in claim 1 wherein said chemical reactor includes an absorber material.

21. The installation as in claim 20 wherein said absorber material is arranged in a fixed bed.

22. The installation as in claim 20 wherein said absorber material is arranged in a fluid bed.

23. The installation as in claim 1 wherein said chemical reactor includes a catalyst.

24. The installation as in claim 1 wherein said chemical reactor includes a chemically active material capable of promoting a decomposition reaction.

25. The installation as in claim 1 wherein said reactor has a wall extending in the given direction, and said light guides have ends extending through and arranged in said wall for introducing radiation into said reactor in a predeterminable manner along said wall.

26. The installation as in claim 1 wherein said light guides are flexibly connected to said reactor.

27. The installation as in claim 1 wherein at least one of said light guides is continuous and uninterrupted from said concentrator into said reactor.

28. The installation as in claim 1 wherein said reactor contains a fluid bed and said light guides lead into the reactor on all sides thereof so that said fluid bed is able to be irradiated from all sides.

29. The installation as in claim 1, wherein solar radiation energy is introducable with intensity decreasing in accordance with the chemical reaction kinetics over the given direction.

30. A solar energy installation for chemical conversions comprising:

a plurality of light concentrators for receiving solar radiation;

a light guide associated with each of said light concentrators;

said light guides flexibly connected to a stationary chemical reactor for introducing radiation therein with intensity variable in a predetermined manner in a given direction of said stationary chemical reactor;

wherein at least one of said light guides is continuous from said light concentrator into said stationary chemical reactor; and solar radiation is varied in accordance with the chemical reaction kinetics over the given direction in said reaction chamber.

* * * * *